(12) United States Patent
Francke et al.

(10) Patent No.: US 11,845,342 B2
(45) Date of Patent: Dec. 19, 2023

(54) CURRENT COLLECTOR AND NON-TRACK-BOUND, ELECTRICALLY DRIVEN VEHICLE WITH A CURRENT COLLECTOR OF THIS KIND

(71) Applicant: SIEMENS MOBILITY GMBH, Munich (DE)

(72) Inventors: Juergen Francke, Berlin (DE); Matthias Nelkel, Berlin (DE)

(73) Assignee: Siemens Mobility GmbH, Munich (DE)

( * ) Notice: Subject to any disclaimer, the term of this patent is extended or adjusted under 35 U.S.C. 154(b) by 421 days.

(21) Appl. No.: 17/277,384

(22) PCT Filed: Sep. 16, 2019

(86) PCT No.: PCT/EP2019/074621
§ 371 (c)(1),
(2) Date: Mar. 18, 2021

(87) PCT Pub. No.: WO2020/058153
PCT Pub. Date: Mar. 26, 2020

(65) Prior Publication Data
US 2021/0354565 A1 Nov. 18, 2021

(30) Foreign Application Priority Data
Sep. 18, 2018 (DE) .......................... 102018215816.9

(51) Int. Cl.
*B60L 5/24* (2006.01)
*B60L 5/20* (2006.01)
(Continued)

(52) U.S. Cl.
CPC .................. *B60L 5/24* (2013.01); *B60L 5/18* (2013.01); *B60L 5/20* (2013.01); *B60L 5/22* (2013.01); *B60L 5/26* (2013.01); *B60L 5/36* (2013.01)

(58) Field of Classification Search
CPC ...... B60L 5/24; B60L 5/20; B60L 5/26; B60L 5/36; B60L 5/18; B60L 5/22
(Continued)

(56) References Cited

U.S. PATENT DOCUMENTS

2020/0231044 A1 7/2020 Francke

FOREIGN PATENT DOCUMENTS

CN 1436130 A 8/2003
CN 104859457 A 8/2015
(Continued)

*Primary Examiner* — S. Joseph Morano
*Assistant Examiner* — James William Jones
(74) *Attorney, Agent, or Firm* — Laurence A. Greenberg; Werner H. Stemer; Ralph E. Locher

(57) ABSTRACT

A current collector for a non-track-bound, electrically driven vehicle for feeding electrical energy from a two-pole overhead line system with two contact wires. Two upper arms are rotatably connected to an adjustable lower arm by toggle joints. Each upper arm carries a contact rocker for contacting the contact wires. Coupling bars are rotatably connected to the upper arms and articulated so that adjustment of the lower arm forces adjustment of the upper arms. A compensating rocker compensates for a height difference between the contact rockers with a rocker stand and a rocker beam. The rocker stand can be rotatably connected to the vehicle and the rocker beam is connected to the coupling bars by way of compensating joints on either side of the rocker joint. At least one stop element limits a rotational movement of the rocker beam about a rocker joint axis of the rocker joint.

8 Claims, 2 Drawing Sheets

(51) Int. Cl.
*B60L 5/36* (2006.01)
*B60L 5/22* (2006.01)
*B60L 5/18* (2006.01)
*B60L 5/26* (2006.01)

(58) Field of Classification Search
USPC .......................................................... 191/50
See application file for complete search history.

(56) References Cited

FOREIGN PATENT DOCUMENTS

| | | | | |
|---|---|---|---|---|
| CN | 107640050 | A | 1/2018 | |
| DE | 69333244 | T2 | 8/2004 | |
| DE | 102011076620 | A1 * | 11/2012 | .......... B60L 11/1837 |
| DE | 102012213460 | A1 * | 2/2014 | .......... B60L 11/1842 |
| DE | 102012213460 | A1 | 2/2014 | |
| DE | 102012223068 | A1 * | 6/2014 | ................ B60L 5/26 |
| DE | 102017203046 | A1 | 8/2018 | |
| EP | 0453721 | A1 * | 2/1991 | |
| FR | 400127 | A | 7/1909 | |
| WO | WO-2018001770 | A1 * | 1/2018 | ................ B60L 5/19 |

\* cited by examiner

CURRENT COLLECTOR AND NON-TRACK-BOUND, ELECTRICALLY DRIVEN VEHICLE WITH A CURRENT COLLECTOR OF THIS KIND

BACKGROUND OF THE INVENTION

Field of the Invention

The invention relates to a current collector for a non-track-bound, electrically driven vehicle for feeding electrical energy from a two-pole overhead line system with two contact wires. The current collector has an adjustable lower arm, which can be connected to the vehicle in a rotatable manner via a base joint, two upper arms, which are connected to the lower arm in a rotatable manner via a knee joint in each case and each carry a contact rocker for contacting one of the contact wires in each case, two coupling rods, which are connected to one of the upper arms in a rotatable manner in each case via a coupling joint in each case and are hinged such that an adjustment of the lower arm forces an adjustment of the upper arms, and a compensating rocker for compensating a height difference between the contact rockers, which has a rocker stand and a rocker bar connected thereto in a rotatable manner via a rocker joint. The rocker stand can be connected to the vehicle in a rotatable manner via a base joint and the rocker bar is connected to the coupling rods in a rotatable manner via compensating joints arranged on both sides of the rocker joint in each case. The invention furthermore relates to a vehicle with a current collector of this kind.

One such vehicle with a current collector for a two-pole contact line system is known from the published unexamined application DE 10 2017 203 046 A1. The current collector has a lower arm that is mounted on a base in a pivotable manner. It furthermore has two upper arms that are mounted at an end of the lower arm opposite the base such that they can be pivoted relative to one another. Two separate contact assemblies assigned to different poles of a contact line are arranged on the respective upper arms. The current collector has a central compensating rocker arranged at the base, as well as two connecting rods, the first end of which is pivotably connected to the compensating rocker in each case and the second end of which is pivotably connected to one of the two upper arms in each case. The central compensating rocker is embodied as a cross bearing that braces against the base. In order to restrict a height difference of the contact assemblies, a crossbar is provided, which is fastened to one upper arm and protrudes into a borehole in the other upper arm, the diameter of which is considerably greater than the diameter of the crossbar.

Due to the known crossbar, the twist angle between the upper arms is restricted by the crossbar striking against the inner wall of the borehole. The restriction of the twist angle is constant for all setting angles of the upper arms, however, which leads to a variable restriction of the height difference of the contact assemblies. As the height position of the contact assemblies increases, a constant restriction of the twist angle causes a decreasing restriction of the height difference.

SUMMARY OF THE INVENTION

The object underlying the invention is therefore to provide an advantageous alternative to the known current collector.

The object is achieved by a current collector of the kind mentioned in the introduction with the features as claimed.

Accordingly, a current collector for a non-track-bound, electrically driven vehicle for feeding electrical energy from a two-pole overhead line system with two contact wires comprises an adjustable lower arm, which can be connected to the vehicle in a rotatable manner via a base joint. The adjustment takes place via a lift drive embodied as an air spring bellows, for example. The current collector comprises two upper arms that are connected to the lower arm in a rotatable manner via a knee joint in each case. At the free end on the contact wire side, the upper arms each carry a contact rocker with contact strips for contacting one of the contact wires in each case. Two coupling rods are connected to one of the upper arms in a rotatable manner in each case via a coupling joint in each case and are hinged such that an adjustment of the lower arm forces an adjustment of the upper arms in the opposite direction. The current collector furthermore comprises a compensating rocker for compensating a height difference between the contact rockers, which has a rocker stand and a rocker bar connected thereto in a rotatable manner via a rocker joint. The rocker stand can be connected to the vehicle in a rotatable manner via a base joint, while the rocker bar is connected to the coupling rods in a rotatable manner via compensating joints arranged on both sides of the rocker joint in each case. According to the invention, at least one end stop element is provided for the rocker bar, which can be connected to the vehicle and restricts a rotary movement of the rocker bar about a rocker joint axis of the rocker joint. The end stop element may be arranged on only one side of the rocker bar, where it only restricts the rocking movement in one direction of rotation, or also in the opposite direction. The shape of the end stop element makes it possible to define a radial spacing between the striking part of the rocker bar and the end stop element. In particular, the radial spacing may vary as a function of the setting angle of the lower arm.

In one advantageous embodiment of the current collector according to the invention, however, one end stop element is provided for both sides of the rocker bar in each case. In this context, it is sufficient to restrict only one direction of rotation of the rocker bar on each side, by the striking forces being conducted into the vehicle via the end stop elements.

In one advantageous embodiment of the current collector according to the invention, a sensing element is arranged on both sides of the rocker bar in each case, which restricts the rotary movement of the rocker bar in the clockwise or counter-clockwise direction when the associated end stop element is touched. Defined striking conditions are created by arranging and shaping the sensing element. The sensing element can be exchanged in the event of wear, without having to replace the entire compensating rocker.

In one advantageous embodiment of the current collector according to the invention, when adjusting the lower arm, a sensing element senses a path in the shape of a circular arc, wherein the end stop element has an arc-shaped striking path for the sensing element. This enables a continuous restriction of the height difference between the contact rockers for each setting angle of the lower arm. The course of the restriction of the height difference is defined by the course of the arc. If the sensing elements are arranged on the same side as the rocker axis in relation to the base joint, then the arc-shaped striking path is embodied in a convex manner, in the other case in a concave manner.

In an advantageous embodiment of the current collector according to the invention, the striking path is embodied as circular, at least in sections, so that in the neutral position of the rocker bar a radial spacing between the sensing element and the striking path in an assigned setting angle section of the lower arm is constant. For setting angles in the upper operating range of the contact rocker, a constant maximum height difference between the contact rockers can be observed as a result.

In an advantageous embodiment of the current collector according to the invention, the striking path is embodied as helical, at least in sections, so that in the neutral position of the rocker bar the radial spacing between the sensing element and the striking path in an assigned setting angle section of the lower arm varies as a function of the setting angle. For setting angles below the contact range of the contact rockers, a diminishing radial spacing can be set as the setting angle decreases, so that the possible height difference decreases when the contact rockers lower. This makes the current collector movement uniform when lowering the current collector into the parked position.

In an advantageous embodiment of the current collector according to the invention, a sensing element is embodied as a sensing roller that is mounted on the rocker bar such that it can rotate about the bar longitudinal axis thereof. This makes it possible for the sensing element, when adjusting or storing the lower arm, to roll on the striking paths of the end stop elements when a sensing roller touches its end stop element, which prevents deceleration on the striking path due to sliding friction and promotes a steady movement of the current collector.

Further properties and advantages of the invention will emerge from the following description of an exemplary embodiment with the aid of the schematic presentation of the drawings.

DETAILED DESCRIPTION OF THE INVENTION

Figure 1:
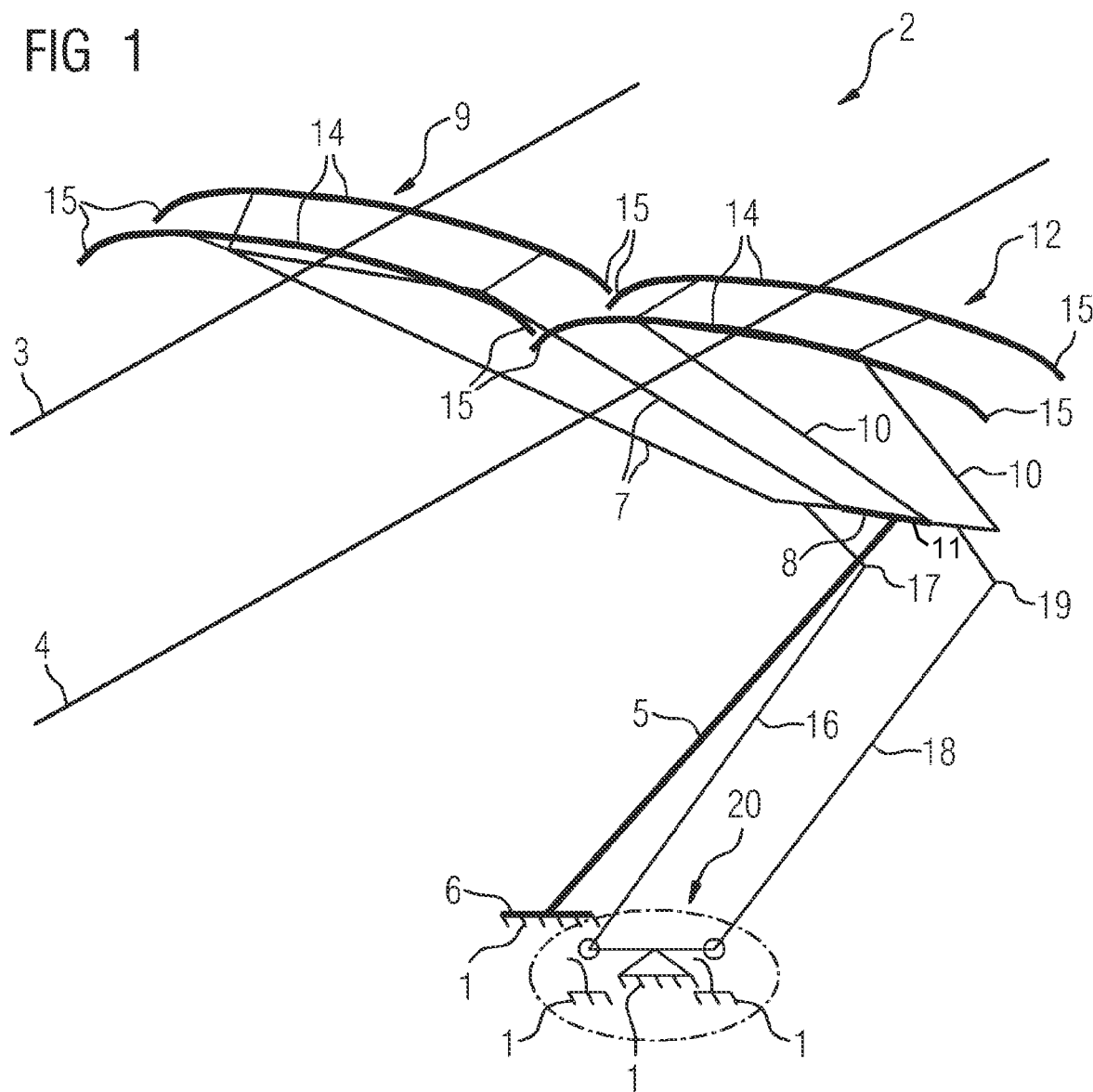
FIG. 1 shows a perspective view of a current collector in a wired state.

According to FIG. 1 a non-track-bound, electrically driven vehicle 1, for example a truck with a diesel electric drive, comprises a current collector 2, via which electrical energy can be fed from an overhead line system, including during the journey. The overhead line system is embodied with two poles and comprises a first contact wire 3 that is embodied as a forward conductor and is tensioned above a lane, and a second contact wire 4 that is embodied as a return conductor, for providing electrical energy. The current collector 2 shown is embodied as a single arm pantograph and comprises an adjustable lower arm 5, which is connected to the vehicle 1 in a rotatable manner via a base joint 6. It further comprises a first upper arm 7, which is connected to the lower arm 5 in a rotatable manner via a first knee joint 8. The first upper arm 7 carries a first contact rocker 9 for contacting the first contact wire 3. In a corresponding manner, the current collector 2 comprises a second upper arm 10, which is connected to the lower arm 5 in a rotatable manner via a second knee joint 11 and carries a second contact rocker 12 for contacting the second contact wire 4. In the exemplary embodiment shown, the axes of the first knee joint 8 and the second knee joint 11 are aligned. The first contact rocker 9 and the second contact rocker 12 are arranged adjacent to one another and each have two contact strips 14 arranged one behind the other, at both ends of which downwardly curved end tips 15 are attached. The adjusting of the lower arm 5 out from the horizontal takes place by way of a lift drive, which for example is embodied as an air spring bellows and is not shown in further detail. The current collector 2 additionally comprises a first coupling rod 16, which is connected to the first upper arm 7 in a rotatable manner via a first coupling joint 17. In a corresponding manner, a second coupling rod 18 is connected to the second upper arm 10 in a rotatable manner via a second coupling joint 19. In this context, the first coupling rod 16 and the second coupling rod 18 are hinged such that raising the lower arm 5 forces a raising of the first upper arm 7 and the second upper arm 10 in relation to the horizontal in the manner of a two-armed lever, which causes the contact rockers 9, 12 to be lifted from a lower parked position into an upper contact position. In particular operating situations of the vehicle 1, the situation may occur in which a height difference emerges between the height positions of the first contact rocker 9 and the second contact rocker 12, for example in the case of a laterally inclined roadway or in the case of the overhead line only being contacted by one of the two contact rockers 9, 12. In order to compensate for this height difference, the current collector 2 comprises a compensating rocker 20.

In accordance with FIG. 2 to FIG. 5, the compensating rocker 20 has a rocker stand 21 and a rocker bar 23 connected thereto in a rotatable manner via a rocker joint 22. The rocker stand 21 is connected to the vehicle 1 in a rotatable manner via a base joint 24. Axes of rotation of the base joint 33, the coupling joints 17, 19 and the knee joints 8, 11 extend in parallel with the axis of rotation of the base joint 6. The rocker bar 23 is connected to the first coupling rod 16 in a rotatable manner via a first compensating joint 25 on one side of the rocker joint 22 and is connected to the second coupling rod 18 in a rotatable manner via a second compensating joint 26 on the other side of the rocker joint 22. The axes of rotation of the rocker joint 22 and the compensating joints 26, 26 extend in parallel with one another and perpendicular to the axis of rotation of the base joint 6.

In order to restrict a height difference between the contact rockers 9, 12, a first end stop element 27 and a second end stop element 28 are provided, which are connected to the vehicle 1 and restrict the rotary movement of the rocker bar 23 about a rocker joint axis 29 of the rocker joint 22 by acting as a mechanical end stop for the movement. In order to ensure defined striking conditions, a first sensing element is arranged on the first side of the rocker bar 23 and a second sensing element is arranged on the other side thereof, which restrict a rotary movement of the rocker bar 23 in the counter-clockwise or clockwise direction when the first end stop element 27 or the second end stop element 28 are touched. The sensing elements are embodied as first sensing rollers 30 and second sensing rollers 31 and are mounted on the mutually opposite ends of the rocker bar 23 such that they can rotate about the bar longitudinal axis 32 thereof. When adjusting the lower arm 5, the sensing rollers 30, 31 move on a path in the shape of a circular arc around the base joint axis 33 of the base joint 24, and in doing so sense an arc-shaped striking path 34a, 34b of the end stop elements 27, 28. The sensing rollers 30, 31 are arranged on the same side as the rocker joint 22 in relation to the base joint 33, meaning that the arc-shaped striking path 34a, 34b is embodied in a convex manner. This makes it possible to continuously restrict the height difference for each setting angle of the lower arm 5.

Figure 2:
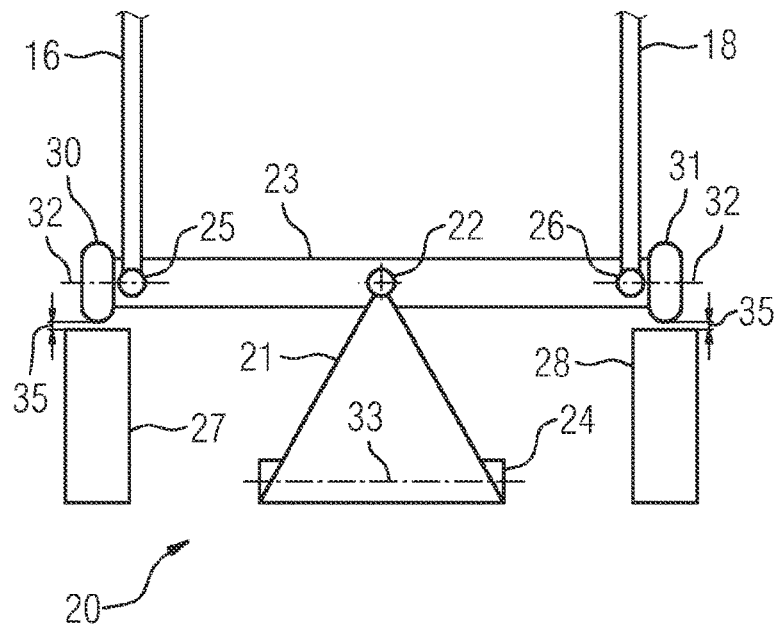
FIG. 2 shows a partial cutout of a front view of the current collector from FIG. 1 with rocker bar in a neutral position.
Figure 3:
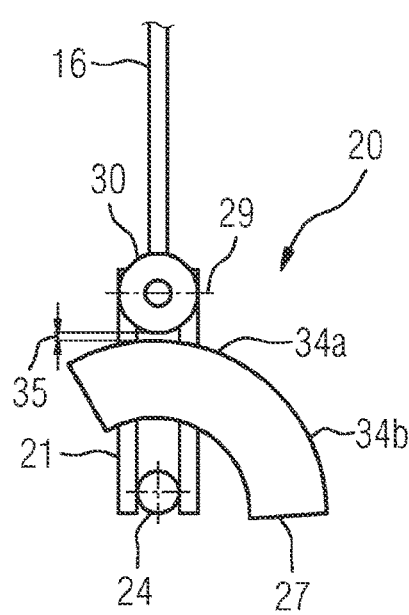
FIG. 3 shows a partial cutout of a side view of the current collector from FIG. 1 with rocker bar in a neutral position.
Figure 4:
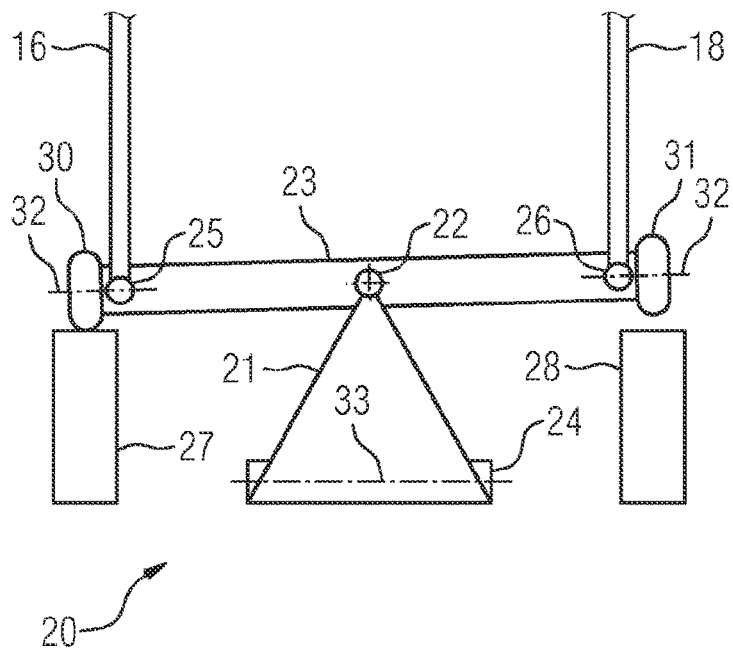
FIG. 4 shows a partial cutout of a front view of the current collector from FIG. 1 with rocker bar in a striking position.
Figure 5:
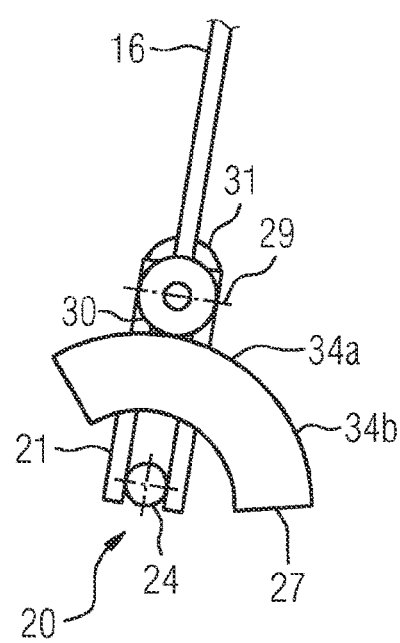
FIG. 5 shows a partial cutout of a side view of the current collector from FIG. 1 with rocker bar in a striking position.

In an upper section of the end stop elements 27, 28, to which a setting angle section of the lower arm 5 in possible contact positions of the contact rockers 9, 12 is assigned, the striking path 34a is embodied in the shape of a circular arc in each case, so that in the neutral position of the rocker bar 23 in accordance with FIG. 2 and FIG. 3 a radial spacing 35 between the sensing rollers 30, 31 and the striking path 34a is constant. Within this section, the height difference between the contact rockers 9, 12 is set to a constant maximum value which is determined by the radial spacing 35. If such a maximum height difference occurs, by the first contact rocker 9 being maximally dipped in relation to the second contact rocker 12, then a maximum relative twisting occurs between the first upper arm 7 and the second upper arm 10, which—conveyed by the coupling rods 16, 18—in accordance with FIG. 4 and FIG. 5 is associated with a maximum rotary deflection of the rocker bar 23 in the counter-clockwise direction. In this context, the first sensing roller 30 touches the first end stop element 27, while the second sensing roller 31 assumes its maximum radial spacing 35 from the second end stop element 27.

In a lower section of the end stop elements 27, 28, to which a setting angle section of the lower arm 5 below possible contact positions of the contact rockers 9, 12 is assigned, the striking path 34b is embodied in a helical manner in each case, so that in the neutral position of the rocker bar 23 the radial spacing 35 between the sensing rollers 30, 31 and the striking path 34b varies as a function of the setting angle in an assigned setting angle section of the lower arm ( ) preferably decreases in the direction of lower setting angles. The permissible height difference between the contact rockers 9, 12 decreases in this manner when the lower arm 5 lowers, which causes a steady lowering and raising of the current collector 2 below possible contact heights.

The invention claimed is:

1. A current collector for a non-track-bound, electrically driven vehicle for feeding electrical energy from a two-pole overhead line system having two contact wires, the current collector comprising:
  an adjustable lower arm to be rotatably connected to the vehicle via a base joint,
  two upper arms rotatably connected to said lower arm via a knee joint, each of said upper arms carrying a contact rocker for contacting a respective one of the contact wires;
  two coupling rods each rotatably connected to a respective one of said upper arms via a coupling joint and hinged such that an adjustment of said lower arm forces an adjustment of said upper arms; and
  a compensating rocker for compensating a height difference between said contact rockers, said compensating rocker having a rocker stand and a rocker bar rotatably connected to one another via a rocker joint,
  said rocker stand being configured for rotatable connection to the vehicle via a further base joint and said rocker bar being rotatably connected to said coupling rods via compensating joints arranged on both sides of said rocker joint; and
  at least one end stop element for said rocker bar to be connected to the vehicle in order to restrict a rotary movement of said rocker bar about a rocker joint axis of said rocker joint.

2. The current collector according to claim 1, wherein each side of said rocker bar is provided with one respective end stop element.

3. The current collector according to claim 1, further comprising a sensing element on each side of said rocker bar and configured to restrict a rotary movement of said rocker bar in a clockwise or counter-clockwise direction when an associated said end stop element is touched.

4. The current collector according to claim 3, wherein, upon an adjustment of said lower arm, said sensing element senses a path in a shape of a circular arc, and wherein said end stop element has an arc-shaped striking path for said sensing element.

5. The current collector according to claim 4, wherein the striking path is circular, at least in sections thereof, so that in a neutral position of said rocker bar a radial spacing between said sensing element and the striking path in an assigned setting angle section of said lower arm is constant.

6. The current collector according to claim 4, wherein the striking path is helical, at least in sections thereof, so that in a neutral position of said rocker bar a radial spacing between said sensing element and the striking path in an assigned setting angle section of said lower arm varies as a function of the setting angle.

7. The current collector according to claim 1, wherein said sensing element is a sensing roller rotatably mounted on said rocker bar about a bar longitudinal axis thereof.

8. A non-track-bound, electrically driven vehicle, comprising a current collector according to claim 1.

* * * * *